Nov. 18, 1930.                F. W. PICHÉ                 1,782,176
                           BRAKE MECHANISM
                         Filed June 6, 1927         2 Sheets-Sheet 1
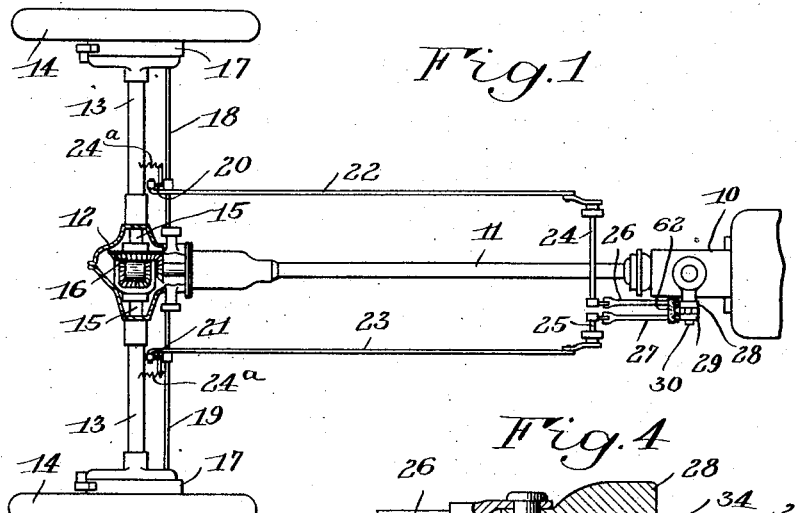
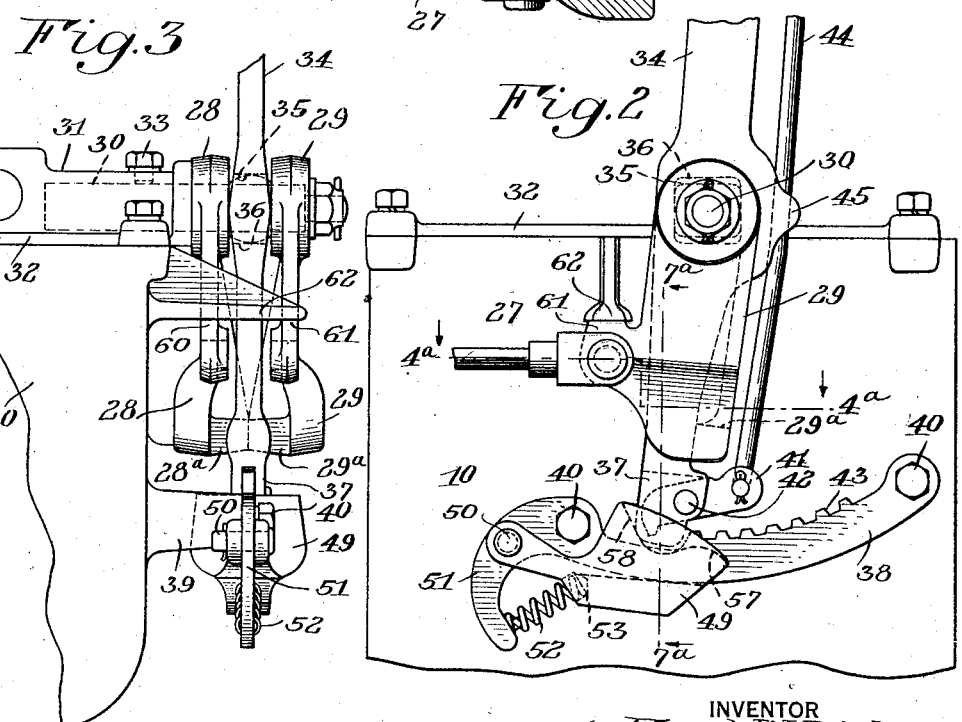
INVENTOR
Frank W. Piché
BY
his ATTORNEYS

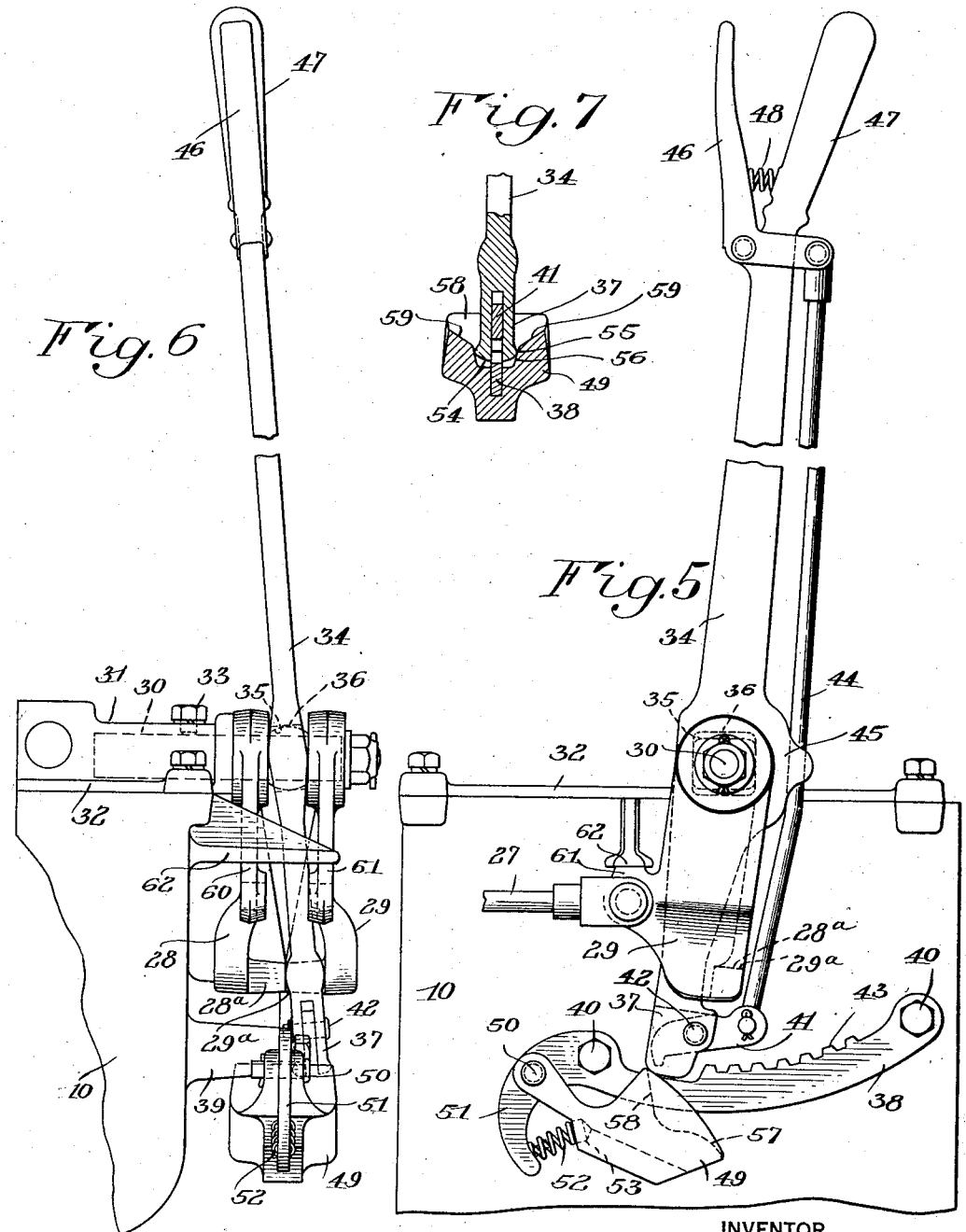

Patented Nov. 18, 1930

1,782,176

UNITED STATES PATENT OFFICE

FRANK W. PICHÉ, OF DETROIT, MICHIGAN

BRAKE MECHANISM

Application filed June 6, 1927. Serial No. 196,713.

The present invention relates to a brake mechanism and has for its object to provide an improved brake control means for use in selectively braking the traction wheels or members of motor vehicles or other power driven machines where one or more of said wheels or members may have lost tractive engagement with the ground and where it is desired to employ the tractive force of the remaining wheels or members to drive the machine.

A further object of the invention is to provide an improved brake mechanism adapted for use as a combined selective control and speed reducing brake for use with motor vehicles having differentially driven traction wheels or other ground engaging propelling means.

A further object of the invention is to provide an improved selective brake mechanism for motor vehicles embodying operating or control means adapted to permit selective operation after movement from a normal release position to a predetermined point or position and including guard means arranged for automatic release by the control means when moved to said point which is also arranged to effect automatic return of the control means to the point from which selective operation takes place.

A further object of the invention is to provide a selective brake mechanism having a simple, economical form of construction, particularly adapted for use with motor vehicles, tractors and the like having one or more sets of traction wheels or members certain of which may from time to time require individual braking for different reasons while others are being driven to advance the vehicle.

To these and other ends the invention resides in certain improvements and combinations of parts, all as will be hereinafter more fully described, the novel features being pointed out in the claims at the end of the specification.

In the drawings:

Figure 1 is a diagrammatic plan view illustrating in part a motor vehicle chassis or frame to which the present invention is shown applied;

Figure 2 is a fragmentary side elevation illustrating one embodiment of the improved brake control mechanism in which the operating parts are shown in normal brake release position;

Figure 3 is a rear elevation of the operating mechanism shown in Figure 2;

Figure 4 is a detail sectional plan taken on line 4ª—4ª of Figure 2;

Figure 5 is a side elevation similar to Figure 2 showing the operating lever moved to a position at which it has effected release of the guard means and from which position it is free to be moved to either of its selective brake applying positions;

Figure 6 is a rear elevation of the arrangement shown in Figure 5 with the brake lever in one of its inclined selective control positions; and Figure 7 is a detail section taken on line 7ª—7ª of Figure 2.

Similar reference numerals throughout the several views indicate the same parts.

The present invention is applicable to the brake systems of various types of motor vehicles whether of the pleasure or commercial type and may be used with any power driven machine having traction wheels or other traction elements by which the machine is advanced. It is particularly adapted for use with motor vehicles having a pair of differentially driven wheels and axles, not only to afford selective or individual braking of the wheels but simultaneous braking of the same as required in a regular speed reducing brake. The invention, though being particularly applicable to hand operated brakes of the wheel drum type may be readily adapted to other forms of brakes designed to be selectively controlled by the shifting of one or more parts to different control positions.

The invention comprises, generally speaking, a control element, such for example, as a lever having a selective movement to position the same for cooperation with the brakes or operating parts therefor to actuate the same either individually or both together and further embodies a locking or guarding device for holding the control means against direct movement from a normal to certain operating positions while permitting it to be moved directly to other operating or control positions. It further embodies guard means for the control or operating device which is automatically moved and released by the latter during a predetermined movement thereof whereby selective operation may be afforded entirely by the use of one hand in a simple manner and with a minimum number of parts.

In the drawings illustrating one embodiment of the invention I have shown in Figure 1, a portion of a motor vehicle frame or chassis embodying a transmission housing 10, a torque tube 11, a differential casing 12, axle housings 13 and traction wheels 14. The wheels are driven in the usual manner through the axles 15 by a differential mechanism of a well known type indicated, generally, at 16, in Figure 1. The brakes which, in the present instance, are of the internal band type, are enclosed in the brake drums 17 on the wheels 14 and are operated by the usual transversely extending brake shafts 18 and 19 having arms 20 and 21 with which are connected the forwardly extending rods 22 and 23 respectively. The brake release springs 24ª may be located at any desired point, being interposed in the present instance, between the axle housings 13 and the arms 20 and 21 on the transverse shafts 18 and 19. The front ends of the rods 22 and 23 are pivotally connected with suitably supported transverse rock shafts 24 and 25, respectively, from which are extended forwardly the brake operating rods or connections 26 and 27. The front ends of said connections are shown pivotally connected in Figure 4 with a pair of vertically disposed brake actuating parts 28 and 29 shown, in the present instance, in the form of levers or arms adapted to swing on a pivotal support 30. The support 30 is preferably in the form of a detachable pivot pin or bolt having its inner end inserted in a sleeve or bearing 31 on the cover 32 of the transmission housing 10 as shown in Figure 3 and having its outer end projecting laterally from the housing. The pivot pin is held in the desired position of adjustment, preferably, by a set screw 33. The brake actuating parts 28 and 29 are spaced apart on the pivotal support 30 and between the same is disposed a control or operating element 34 in the form of a lever mounted both for a pivotal and a lateral swinging or rocking movement whereby it may be operated in three different planes, in one of which it is normally held and in which it is movable to effect simultaneous operation of the brake actuating parts 28 and 29 as when in the vertical position shown in Figures 3 and 4. In the other or relatively inclined positions, one of which is shown in Figure 6 it is adapted for movement to effect separate or individual application of the brakes as pointed out hereinafter. The lateral rocking movements are permitted by loosely sleeving a block or bearing 35 upon the pivotal support 30 and within an opening 36 of the lever 34, the bearing having its peripheral face or portions thereof convexly curved as indicated in Figures 3 and 6 so that the lever is free to rock thereon whereby it can be shifted to different relatively inclined planes when it is held against lateral movement by the guard means therefor hereinafter described. The lever is made thick enough at its pivotal point to hold the brake actuating elements 28 and 29 spaced apart and has its sides tapered for a short distance as shown in Figure 3 to permit it to be rocked in opposite directions so that its lower end can be shifted to clear or engage either of the inwardly projecting lugs 28ª and 29ª of the actuating parts 28 and 29 by movement from the central position shown in Figure 4 in which the lever is adapted to effect simultaneous application of the brakes when a rearward pull is exerted on its upper end in moving it from the position shown in Figure 2. The operating lever is forked at its lower end or provided with spaced jaws or extensions 37 adapted to straddle a latch bar 38 spaced from and suitably supported, preferably by laterally projecting lugs 39 on the transmission housing 10 to which the bar is connected by bolts 40. A latch or lock member 41 is provided for the lever which is pivotally disposed between the extensions 37 upon a pin 42 projecting therethrough. The latch is adapted to engage the teeth 43 of the bar to lock the lever, only when the latter is in position to apply both brakes through engagement with the lugs of both arms 28 and 29 and when the lever is in the vertical plane in which it moves to effect simultaneous application of the brakes. Release of the latch is effected by a vertically disposed rod 44 preferably guided in a groove formed in the front face of the enlarged fulcrum portion 45 of the lever. The rod is operated by a small bell crank 46 pivoted on the upper end of the lever 34 adjacent the hand grip 47 thereof and is actuated by a spring 48 to maintain the latch 41 in locking position.

Movement of the operating lever 34 to either of its inclined selective braking positions is permitted only when the lever is in one or more predetermined positions, one such position being provided in the present instance by reducing the depth of the latch bar at its rear end to permit the lower extensions 37 of the lever to pass over the bar at this point when the lever is moved laterally to either of said inclined or selective braking positions.

Means has been provided for preventing accidental movement of the brake operating lever to selective position, since it has been found that in moving the same from normal release position to apply the several brakes simultaneously the operator may sometimes exert a lateral pull thereon instead of a straight rearward pull in the vertical plane in which it is desired to move the lever. Such a pull might during the initial operation of the lever throw it into selective brake position since its lower end at this time is in position to clear the teeth of the latch bar. A guard for the lever has therefore been provided as indicated at 49 which will prevent its lateral movement until the guard is first released automatically by moving the lower end of the lever rearwardly to the position shown in Figure 5. The guard is adapted to straddle the latch bar 38 and is provided with rearwardly extending arms which are pivoted at 50 on the curved extension 51 of the latch bar, the guard being yieldably held in engagement with the under side of the bar by a spring 52 having one end suitably secured upon the extension 51 and the other disposed in a recess 53 formed in the bottom of the guard.

The guard is provided with a central recess 54 in which the lower ends of the jaws 37 of the operating lever are disposed when the lever is in the normal release position shown in Figures 2 and 7. The jaws 37 are provided with rounded lateral projections 55 which frictionally engage the sides 56 of the recess 54 and normally hold the lever centered between the brake actuating parts 28 and 29. The guard is provided with inclined front and rear cam faces 57 and 58 which extend forwardly and rearwardly of the recess 54, the face 58 being inclined at a relatively steep angle so that a slight rearward movement of the lower end of the lever 34, as from the normal position shown in Figure 2 to that shown in Figure 5, will suffice to depress the guard sufficiently to free the lever so that its lower end can be swung laterally to either of its selective or individual brake applying positions. The inclined portions 57 in front of the lower end of the lever are of such a contour or inclination that whenever the lever is moved to apply both brakes simultaneously, as when reducing the speed of the vehicle or is moved rearwardly to release the brakes the guard is slightly depressed whereby it is prevented from sticking or wedging because of rust or grit which might accumulate through lack of frequent use of the parts in the selective braking operations. The yieldability of the guard allows the lower end of the lever to ride easily into the same while depressing it on return of the lever to full release position after simultaneous application of the brakes, thus preventing the possibility of a wedging or binding action of the parts under such an operation. The guard is also designed to automatically center or return the operating lever to the plane which it normally occupies when not in operation, i. e. when returning from either of the inclined planes in which it is moved to effect individual operation of the brakes. This is done through engagement of the lower ends of the jaws 37 with the inclined cam faces 59 of the guard which by the camming action afforded serve to swing the lever, upon return from either individual brake applying position back into its central or normal plane of operation. The faces 59 being inclined inwardly and downwardly toward the center of the guard cause the lever to ride easily into the recess 54 where the lever is held against lateral movement. Under the action of the springs $24^a$ and actuating arms or elements 28 and 29 the lower end of the lever may be pulled rearwardly to normal position upon release, or may be returned by the operator, if desired. The automatic return of the lever may be effected by one or the other of the lugs $28^a$—$29^a$ in engagement with the front portion of the lever at a point slightly above the latch 41 during return of the arms or actuating levers 28 and 29 by the springs $24^a$ as stated above. It will be understood that the lower end of the lever is quickly snapped into the guard upon return from any of its operating positions, the guard being first slightly depressed by the lever and then forced upwardly by the spring 52, as the bottom of the lever rides into the recess 54 to the position shown in Figures 2 and 7. Rearward movement of the actuating arms 28 and 29 is limited through engagement of lugs 60 and 61 thereon with a stop 62 projecting laterally from the transmission housing 10.

Briefly, in the operation of the brakes, when the lever 34 is moved from the position shown in Figure 2 to effect simultaneous application of both brakes, the operator will depress the rod 44 to raise the rear end of the latch 41 at the same time exerting a rearward pull on the upper end of the lever to throw the lower end forwardly whereby, through engagement of the lever with the lugs $28^a$ and $29^a$ the arms or actuating members will exert a forward pull on the connections 26 and 27 to apply both brakes as in the ordinary braking operations. The lever may then be locked by allowing the latch 41 to move into engagement with the teeth of the latch bar in the usual manner. Upon release of the lever, the springs $24^a$ will return the same to normal position and as the lower end of the lever rides over the surfaces 57 of the guard, the latter will be slightly rocked, for the purposes stated above and the spring 52 will return the guard to normal position with the lower end of the lever in the recess 54 thereof. When, however, it is desired to effect selective operation of the brakes, as, for example, to retard a wheel which spins idly through failure to grip the ground and to thereby direct the driving force into the opposite wheel the operator, on gripping the upper end of the lever will first move it forwardly until its lower end moves the guard to release position as indicated in Figure 5. From this position, the lever is rocked either to the right or left as the case may be until it is in the required inclined plane with its lower end clear of the latch bar. The operator will then exert a rearward pull on the upper end of the lever and its lower end at this time being in engagement with only one of the actuating arms will effect application of the particular brake connected therewith while the other brake will remain in release position. When it is desired to release the brake, the operator may pull the lever back or permit the one or more brake release springs connected therewith to retract it. As its lower end enters the guard the latter is first slightly depressed and during movement of the lower ends of the jaws 37 of the lever over the inclined or cam surfaces 59 of the guard, the desired camming action will take place and the lever will be automatically straightened up and centered between the arms 28 and 29. During this time, the spring 52 in returning the depressed guard to normal position will cause it to complete the camming operation so that the lower end of the lever will again occupy a position within the recess 54 of the guard as shown in Figure 7.

While the invention has been described as applied to the control of vehicle brakes, it is obvious that it is not necessarily limited to brakes of this class and the exemplary embodiment herein disclosed is, of course, capable of various modifications within the scope of the appended claims.

I claim as my invention:

1. The combination with a vehicle frame having a plurality of traction members and brakes therefor having different actuating parts, an operating device for said actuating parts mounted for movement to different selective positions to effect individual operation of said actuating parts and a guard for said operating device arranged to be moved to release position by movement of the operating device to a predetermined position in advance of its movement to said selective positions.

2. The combination with a vehicle frame having a plurality of traction members and brakes therefor having different actuating parts, an operating lever for said actuating parts mounted for movement to different operating positions to effect independent operation of said actuating parts and a guard for said lever normally holding the lever in a predetermined position from which the lever is movable to effect automatic release of the guard whereby to permit each of the actuating parts to be moved by the lever.

3. The combination with a vehicle frame having a plurality of traction members and brakes therefor having different actuating parts, an operating device for said actuating parts mounted for movement to effect independent operation of said actuating parts and also movable to effect simultaneous operation of said parts and a guard for said operating device arranged to be released by movement of the latter from a normal to a predetermined position from which the operating device is movable to effect selective operation of said actuating parts.

4. The combination with a vehicle frame having a plurality of traction members and brakes therefor having different actuating parts, an operating device for said parts including a lever having a normal release position and arranged to be moved therefrom in different planes to effect simultaneous or selective operation of said parts and a pivoted guard for the lever having cam portions adapted when the lever is returned from the selective operating positions to automatically shift it from the plane in which it moves to the plane which it occupies in said normal release position.

5. The combination with a vehicle frame having a plurality of traction members and brakes therefor having different actuating parts, an operating member for said actuating parts mounted for movement to different brake-applying positions, means for latching said member in one of said positions and a guard normally holding said member against movement to one brake-applying position, said guard being released by movement of said member from normal to a predetermined position.

6. The combination with a vehicle frame having a plurality of traction members and brakes therefor having different actuating parts, an operating member mounted for movement to effect simultaneous or selective movement of said parts to brake-applying position, means for latching said member in one brake-applying position and a spring pressed guard for said member adapted to be released by the latter upon movement thereof from normal to a predetermined position.

7. The combination with a vehicle frame having a plurality of traction members and brakes therefor having different actuating parts including a pair of pivoted arms, an operating lever mounted for movement from a normal to a predetermined position from which position it is free to swing laterally in opposite directions to position it for selective operation of said arms and guard means for holding said lever against lateral movement in said opposite directions until moved to said predetermined position, said guard means being moved by the lever to release the latter when the lever is moved from said normal to said predetermined position.

8. The combination with a vehicle frame having a plurality of traction members and brakes therefor having different actuating parts, an operating lever arranged for movement in a plane from a normal brake release position to effect simultaneous movement of said parts, said lever being movable in different planes to effect individual operation of said parts, means for latching the lever when in position to effect simultaneous application of the brakes and yieldable guard means for holding the lever against movement from the first to the second mentioned planes until it is first moved from said normal position to a predetermined position at which it is freed for movement to the second mentioned planes, said guard means being automatically moved by the lever to release the latter when said lever is moved from said normal to said predetermined position.

9. The combination with a vehicle frame having a plurality of traction members and brakes therefor having different actuating parts, an upstanding lever arranged for movement in a substantially vertical plane from a normal brake release position to effect simultaneous operation of said parts, said lever being mounted for movement to a selective position from which it is movable laterally to different planes and subsequently in said planes to effect independent operation of said parts and guard means for the lever having a cam portion with which the lever cooperates to effect its release when moving to said selective position.

10. The combination with a motor vehicle having a pair of differentially driven wheels and separate brakes for said wheels, a selective control device for said brakes including separate actuating parts therefor and an operating member movable from a normal brake release position in different planes to effect selective operation of said parts and a guard separate from said member arranged to hold it against movement in said planes until it is first moved to a predetermined position in a direction opposite to that in which it is moved when applying the brakes and by which movement it is freed from the guard.

11. The combination with a motor vehicle having a pair of traction wheels and a differential driving mechanism therefor, separate brakes for said wheels, a pair of movable members for effecting operation of said brakes, a lever mounted to swing between said members and arranged for lateral movement in different planes after movement from a normal to a predetermined position from which position it is movable to effect selective operation of said members by movement in said planes, said lever being also movable from said normal position to effect simultaneous operation of said movable members, means for latching the lever in one of its brake applying positions and a guard for holding said lever against movement in said planes until moved to said predetermined position, said guard being automatically moved by the lever to release the latter for movement in said planes when it is moved to said predetermined position.

12. The combination with a vehicle frame having a plurality of traction members and brakes therefor having different actuating parts, an operating device for said actuating parts mounted for movement from a normal to a predetermined position from which position it is adapted for movement to different selective positions to effect separate operation of said parts and individual application of the brakes and a guard for said operating device arranged to be moved by the latter to release it when moved to said predetermined position, said guard being also arranged to direct the operating device back to said predetermined position when returning from either brake applying position.

13. The combination with a vehicle frame having a plurality of traction members and brakes therefor having different actuating parts, an operating device mounted for movement in different planes to effect independent operation of said parts and a guard for said operating device adapted to be moved thereby when the operating device is moved in a predetermined plane to effect release thereof at a predetermined point from which the operating device is free to move in either of the first mentioned planes, said guard serving to automatically return the operating device to the second mentioned plane when it is returned from brake applying position into engagement with the guard.

14. The combination with a motor vehicle having a pair of differentially driven wheels and separate brakes for said wheels, a selective control device for said brakes comprising separate actuating parts and an upstanding lever movable from a normal brake release position to effect simultaneous or selective operation of said parts and a pivoted guard for said lever recessed to receive the lower end thereof and having inclined faces engaged by the lever whereby the latter when moved from normal position will effect release of the guard.

15. In a brake mechanism of the class described, a support, a pair of actuating elements movable thereon and adapted for connection with separate brake devices, a brake operating member for said elements mounted for movement to different selective positions to effect individual operation of said actuating elements and a guard for said member arranged to be automatically moved to release position by movement of the member to a predetermined position in advance of its movement to said selective positions.

16. In a brake mechanism of the class described, a support, a pair of actuating elements movable thereon and adapted for connection with separate brake devices, a brake operating member mounted upon the support to effect either selective or simultaneous operation of said elements and a guard for said member arranged to be moved thereby to release the same for selective operation by movement of said member to a predetermined position in advance of its movement to selective position.

17. In a brake mechanism of the class described, a support, a pair of actuating elements movable thereon and adapted for connection with separate brake devices, a brake operating lever mounted upon the support for movement in a plane to effect simultaneous operation of said elements and being also movable to effect selective operation of the same and a pivoted guard for the lever, said guard being automatically moved to release the lever for selective operation by movement of the latter to a predetermined position in advance of its movement to selective position, the guard being also constructed to automatically swing the lever into said plane when returning from selective brake applying position.

FRANK W. PICHÉ.